United States Patent
Smoot

(10) Patent No.: US 12,176,935 B2
(45) Date of Patent: Dec. 24, 2024

(54) CARRIER PREDISTORTION TO IMPROVE SIGNAL QUALITY OF LINKS ON FLAT PANEL ANTENNAS

(71) Applicant: Kymeta Corporation, Redmond, WA (US)

(72) Inventor: Maxwell A. Smoot, Seattle, WA (US)

(73) Assignee: Kymeta Corporation, Redmond, WA (US)

( * ) Notice: Subject to any disclaimer, the term of this patent is extended or adjusted under 35 U.S.C. 154(b) by 61 days.

(21) Appl. No.: 17/949,548

(22) Filed: Sep. 21, 2022

(65) Prior Publication Data
US 2023/0091821 A1 Mar. 23, 2023

Related U.S. Application Data

(60) Provisional application No. 63/247,222, filed on Sep. 22, 2021.

(51) Int. Cl.
*H04B 1/04* (2006.01)
*H01Q 13/10* (2006.01)
*H04B 7/185* (2006.01)

(52) U.S. Cl.
CPC ......... *H04B 1/0475* (2013.01); *H01Q 13/103* (2013.01); *H04B 7/18517* (2013.01); *H04B 2001/0425* (2013.01)

(58) Field of Classification Search
CPC .. H01Q 1/3208; H01Q 1/3275; H01Q 13/103; H04B 1/0475; H04B 2001/0425; H04B 7/18517
USPC ........................................................ 455/12.1
See application file for complete search history.

(56) References Cited

U.S. PATENT DOCUMENTS

| | | | |
|---|---|---|---|
| 10,637,694 B1 * | 4/2020 | Nammi | H04W 52/16 |
| 10,812,166 B2 * | 10/2020 | Kim | H04L 25/03343 |
| 2003/0156658 A1 * | 8/2003 | Dartois | H03F 1/3247 |
| | | | 375/297 |
| 2003/0179831 A1 * | 9/2003 | Gupta | H04L 27/367 |
| | | | 375/296 |
| 2003/0202615 A1 | 10/2003 | Bach et al. | |
| 2013/0303080 A1 | 11/2013 | Moreno | |
| 2015/0311927 A1 * | 10/2015 | Beidas | H04L 25/03343 |
| | | | 375/296 |
| 2016/0065400 A1 | 3/2016 | Bjorkman et al. | |
| 2017/0054210 A1 * | 2/2017 | Gallagher | H01Q 3/2611 |
| 2018/0115068 A1 * | 4/2018 | Sazegar | H01Q 5/48 |
| 2018/0123260 A1 * | 5/2018 | Sikes | H01Q 15/0053 |

(Continued)

OTHER PUBLICATIONS

International Search Report and Written Opinion on the Patentability of Application No. PCT/US2022/044424 Mailed Jan. 13, 2023, 9 pages.

(Continued)

*Primary Examiner* — Tan H Trinh
(74) *Attorney, Agent, or Firm* — Womble Bond Dickinson (US) LLP

(57) ABSTRACT

Methods and apparatuses for performing predistortion on transmissions to antennas are disclosed. In some embodiments, a method includes obtaining a type and scan angle of a flat panel antenna of a satellite terminal; selecting, based on the type and the scan angle, predistortion to apply to a signal to be transmitted to the flat panel antenna; applying the predistortion to the signal; and transmitting the signal to the flat panel antenna of the satellite terminal.

20 Claims, 9 Drawing Sheets

(56) References Cited

U.S. PATENT DOCUMENTS

| | | |
|---|---|---|
| 2018/0316367 A1 | 11/2018 | Johansson et al. |
| 2020/0145150 A1* | 5/2020 | Beidas ................ H04L 27/2634 |
| 2020/0213167 A1 | 7/2020 | Nammi et al. |
| 2020/0245210 A1* | 7/2020 | Fotheringham ....... H04W 36/14 |
| 2021/0203411 A1* | 7/2021 | Hultman ............ H04B 7/18513 |
| 2022/0386400 A1* | 12/2022 | Posthuma ............ H04W 40/36 |
| 2023/0268942 A1* | 8/2023 | Ghannouchi .......... H04B 10/00 375/297 |

OTHER PUBLICATIONS

International Preliminary Report on Patentability received for PCT Patent Application No. PCT/US2022/044424, mailed on Apr. 4, 2024, 6 pages.

\* cited by examiner

CARRIER PREDISTORTION TO IMPROVE SIGNAL QUALITY OF LINKS ON FLAT PANEL ANTENNAS

RELATED APPLICATION

The present application is a non-provisional application of and claims the benefit of U.S. Provisional Patent Application No. 63/247,222, filed Sep. 22, 2021, and entitled "Carrier Predistortion to Improve Signal Quality of High Bandwidth Links on Flat Panel Antennas", which is incorporated by reference in its entirety.

FIELD

Embodiments of the present disclosure are related to wireless communication; more particularly, to the application of predistortion to transmissions by a satellite carrier when communicating with flat panel antennas of ground stations.

BACKGROUND

Flat panel antennas are frequently used in satellite communication systems today. There are numerous types of flat panel antennas, such as, for example, phased array antennas, and they are often part of satellite network terminals. Recently, metasurface antennas have emerged as a flat panel antenna used on satellite network terminals. Metasurface antennas generate steered, directive beams from a lightweight, low-cost, and planar physical platform. More specifically, metasurface antennas may comprise metamaterial antenna elements that can selectively couple energy from a feed wave to produce beams that may be controlled for use in communication. These antennas are capable of achieving comparable performance to phased array antennas from an inexpensive and easy-to-manufacture hardware platform.

SUMMARY

Methods and apparatuses for performing predistortion on transmissions to antennas are disclosed. In some embodiments, a method includes obtaining a type and scan angle of a flat panel antenna of a satellite terminal; selecting, based on the type and the scan angle, predistortion to apply to a signal to be transmitted to the flat panel antenna; applying the predistortion to the signal; and transmitting the signal to the flat panel antenna of the satellite terminal.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
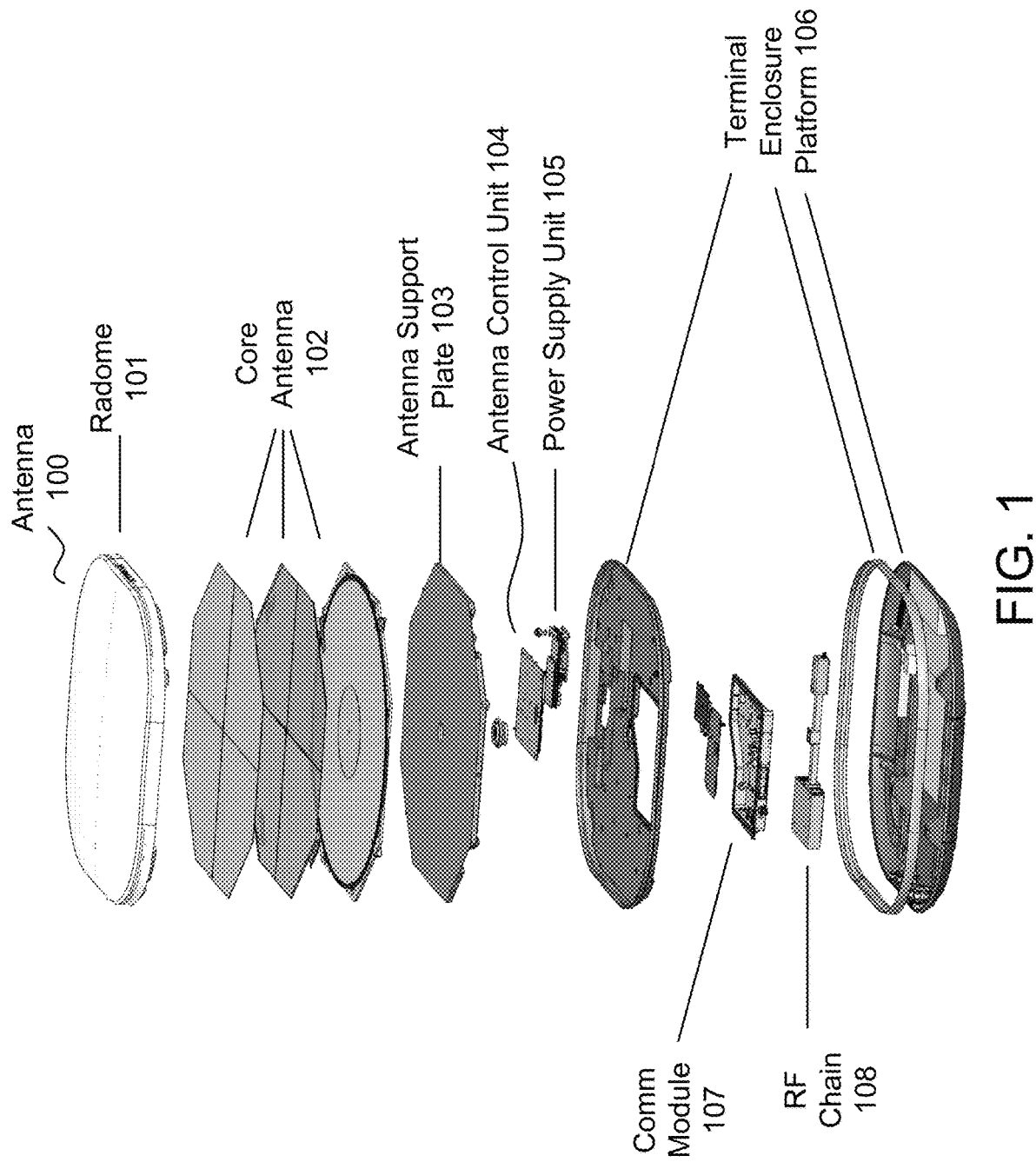
FIG. 1 illustrates an exploded view of some embodiments of a flat-panel antenna.

In the following description, numerous details are set forth to provide a more thorough explanation of embodiments of the present disclosure. It will be apparent, however, to one skilled in the art, that the embodiments may be practiced without these specific details. In other instances, well-known structures and devices are shown in block diagram form, rather than in detail, in order to avoid obscuring the claimed embodiments.

Methods and apparatuses for controlling transmissions to antennas are disclosed. In some embodiments, the transmissions are performed in a satellite communication system. In some embodiments, transmissions between a satellite and a ground station are shaped to counteract the distortion associated with the transfer function of the antenna of the ground station. In some embodiments, the ground station is a satellite network terminal. In some embodiments, the transmissions are shaped by applying predistortion to signals being transmitted between a satellite and a ground station. This is in contrast to current commercial satellite communications that do not currently predistort carriers to support characteristics of antennas receiving the satellite transmissions. In some embodiments, the predistortion is performed by the satellite. Examples of these satellites employing these techniques are described below.

The following disclosure discusses examples of antenna embodiments followed by descriptions of techniques for shaping transmissions by applying predistortion to signals being transmitted from satellites to antennas, including, for example, the antennas described herein.

Examples of Antenna Embodiments

The techniques described herein may be used with a variety of flat panel satellite antennas. Embodiments of such flat panel antennas are disclosed herein. In some embodiments, the flat panel satellite antennas are part of a satellite terminal. The flat panel antennas include one or more arrays of antenna elements on an antenna aperture.

In some embodiments, the antenna aperture is a metasurface antenna aperture, such as, for example, the antenna apertures described below. In some embodiments, the antenna elements comprise radio-frequency (RF) radiating antenna elements. In some embodiments, the antenna elements include tunable devices to tune the antenna elements. Examples of such tunable devices include diodes and varactors such as, for example, described in U.S. Patent Application Publication No. 20210050671, entitled "Metasurface Antennas Manufactured with Mass Transfer Technologies," published Feb. 18, 2021. In some other embodiments, the antenna elements comprise liquid crystal (LC)-based antenna elements, such as, for example, those disclosed in U.S. Pat. No. 9,887,456, entitled "Dynamic Polarization and Coupling Control from a Steerable Cylindrically Fed Holographic Antenna", issued Feb. 6, 2018, or other RF radiating antenna elements. It should be appreciated that other tunable devices such as, for example, but not limited to, tunable capacitors, tunable capacitance dies, packaged dies, microelectromechanical systems (MEMS) devices, or other tunable capacitance devices, could be placed into an antenna aperture or elsewhere in variations on the embodiments described herein.

In some embodiments, the antenna aperture having the one or more arrays of antenna elements is comprised of multiple segments that are coupled together. In some embodiments, when coupled together, the combination of the segments form groups of antenna elements (e.g., closed concentric rings of antenna elements concentric with respect to the antenna feed, etc.).

For more information on antenna segments, see U.S. Pat. No. 9,887,455, entitled "Aperture Segmentation of a Cylindrical Feed Antenna", issued Feb. 6, 2018.

FIG. 1 illustrates an exploded view of some embodiments of a flat-panel antenna. Referring to FIG. 1, antenna 100 comprises a radome 101, a core antenna 102, antenna support plate 103, antenna control unit (ACU) 104, a power supply unit 105, terminal enclosure platform 106, comm (communication) module 107, and RF chain 108.

Radome 101 is the top portion of an enclosure that encloses core antenna 102. In some embodiments, radome 101 is weatherproof and is constructed of material transparent to radio waves to enable beams generated by core antenna 102 to extend to the exterior of radome 101.

In some embodiments, core antenna 102 comprises an aperture having RF radiating antenna elements. These antenna elements act as radiators (or slot radiators). In some embodiments, the antenna elements comprise scattering metamaterial antenna elements. In some embodiments, the antenna elements comprise both Receive (Rx) and Transmit (Tx) irises, or slots, that are interleaved and distributed on the whole surface of the antenna aperture of core antenna 102. Such Rx and Tx irises may be in groups of two or more sets where each set is for a separately and simultaneously controlled band. Examples of such antenna elements with irises are described in U.S. Pat. No. 10,892,553, entitled "Broad Tunable Bandwidth Radial Line Slot Antenna", issued Jan. 12, 2021.

In some embodiments, the antenna elements comprise irises (iris openings) and the aperture antenna is used to generate a main beam shaped by using excitation from a cylindrical feed wave for radiating the iris openings through tunable elements (e.g., diodes, varactors, patch, etc.). In some embodiments, the antenna elements can be excited to radiate a horizontally or vertically polarized electric field at desired scan angles.

In some embodiments, a tunable element (e.g., diode, varactor, patch etc.) is located over each iris slot. The amount of radiated power from each antenna element is controlled by applying a voltage to the tunable element using a controller in ACU 104. Traces in core antenna 102 to each tunable element are used to provide the voltage to the tunable element. The voltage tunes or detunes the capacitance and thus the resonance frequency of individual elements to effectuate beam forming. The voltage required is dependent on the tunable element in use. Using this property, in some embodiments, the tunable element (e.g., diode, varactor, LC, etc.) integrates an on/off switch for the transmission of energy from a feed wave to the antenna element. When switched on, an antenna element emits an electromagnetic wave like an electrically small dipole antenna. Note that the teachings herein are not limited to having unit cell that operates in a binary fashion with respect to energy transmission. For example, in some embodiments in which varactors are the tunable element, there are 32 tuning levels. As another example, in some embodiments in which LC is the tunable element, there are 16 tuning levels.

A voltage between the tunable element and the slot can be modulated to tune the antenna element (e.g., the tunable resonator/slot). Adjusting the voltage varies the capacitance of a slot (e.g., the tunable resonator/slot). Accordingly, the reactance of a slot (e.g., the tunable resonator/slot) can be varied by changing the capacitance. Resonant frequency of the slot also changes according to the equation $$f = \frac{1}{2\pi\sqrt{LC}}$$

where f is the resonant frequency of the slot and L and C are the inductance and capacitance of the slot, respectively. The resonant frequency of the slot affects the energy coupled from a feed wave propagating through the waveguide to the antenna elements.

In particular, the generation of a focused beam by the metamaterial array of antenna elements can be explained by the phenomenon of constructive and destructive interference, which is well known in the art. Individual electromagnetic waves sum up (constructive interference) if they have the same phase when they meet in free space to create a beam, and waves cancel each other (destructive interference) if they are in opposite phase when they meet in free space. If the slots in core antenna 102 are positioned so that each successive slot is positioned at a different distance from the excitation point of the feed wave, the scattered wave from that antenna element will have a different phase than the scattered wave of the previous slot. In some embodiments, if the slots are spaced one quarter of a wavelength apart, each slot will scatter a wave with a one fourth phase delay from the previous slot. In some embodiments, by controlling which antenna elements are turned on or off (i.e., by changing the pattern of which antenna elements are turned on and which antenna elements are turned off) or which of the multiple tuning levels is used, a different pattern of constructive and destructive interference can be produced, and the antenna can change the direction of its beam(s).

In some embodiments, core antenna 102 includes a coaxial feed that is used to provide a cylindrical wave feed via an input feed, such as, for example, described in U.S. Pat. No. 9,887,456, entitled "Dynamic Polarization and Coupling Control from a Steerable Cylindrically Fed Holographic Antenna", issued Feb. 6, 2018 or in U.S. Patent Application Publication No. 20210050671, entitled "Metasurface Antennas Manufactured with Mass Transfer Technologies," published Feb. 18, 2021. In some embodiments, the cylindrical wave feed feeds core antenna 102 from a central point with an excitation that spreads outward in a cylindrical manner from the feed point. In other words, the cylindrically fed wave is an outward travelling concentric feed wave. Even so, the shape of the cylindrical feed antenna around the cylindrical feed can be circular, square or any shape. In some other embodiments, a cylindrically fed antenna aperture creates an inward travelling feed wave. In such a case, the feed wave most naturally comes from a circular structure.

In some embodiments, the core antenna comprises multiple layers. These layers include the one or more substrate layers forming the RF radiating antenna elements. In some embodiments, these layers may also include impedance matching layers (e.g., a wide-angle impedance matching (WAIM) layer, etc.), one or more spacer layers and/or dielectric layers. Such layers are well-known in the art.

Antenna support plate 103 is coupled to core antenna 102 to provide support for core antenna 102. In some embodiments, antenna support plate 103 includes one or more waveguides and one or more antenna feeds to provide one or more feed waves to core antenna 102 for use by antenna elements of core antenna 102 to generate one or more beams.

ACU 104 is coupled to antenna support plate 103 and provides controls for antenna 100. In some embodiments, these controls include controls for drive electronics for antenna 100 and a matrix drive circuitry to control a switching array interspersed throughout the array of RF radiating antenna elements. In some embodiments, the matrix drive circuitry uses unique addresses to apply voltages onto the tunable elements of the antenna elements to drive each antenna element separately from the other antenna elements. In some embodiments, the drive electronics for ACU 104 comprise commercial off-the shelf LCD controls used in commercial television appliances that adjust the voltage for each antenna element.

More specifically, in some embodiments, ACU 104 supplies an array of voltage signals to the tunable devices of the antenna elements to create a modulation, or control, pattern. The control pattern causes the elements to be tuned to different states. In some embodiments, ACU 104 uses the control pattern to control which antenna elements are turned on or off (or which of the tuning levels is used) and at which phase and amplitude level at the frequency of operation. The elements are selectively detuned for frequency operation by voltage application. In some embodiments, multistate control is used in which various elements are turned on and off to varying levels, further approximating a sinusoidal control pattern, as opposed to a square wave (i.e., a sinusoid gray shade modulation pattern).

In some embodiments, ACU 104 also contains one or more processors executing the software to perform some of the control operations. ACU 104 may control one or more sensors (e.g., a GPS receiver, a three-axis compass, a 3-axis accelerometer, 3-axis gyro, 3-axis magnetometer, etc.) to provide location and orientation information to the processor(s). The location and orientation information may be provided to the processor(s) by other systems in the earth station and/or may not be part of the antenna system.

Antenna 100 also includes a comm (communication) module 107 and an RF chain 108. Comm module 107 includes one or more modems enabling antenna 100 to communicate with various satellites and/or cellular systems, in addition to a router that selects the appropriate network route based on metrics (e.g., quality of service (QoS) metrics, e.g., signal strength, latency, etc.). RF chain 108 converts analog RF signals to digital form. In some embodiments, RF chain 108 comprises electronic components that may include amplifiers, filters, mixers, attenuators, and detectors.

Antenna 100 also includes power supply unit 105 to provide power to various subsystems or parts of antenna 100.

Antenna 100 also includes terminal enclosure platform 106 that forms the enclosure for the bottom of antenna 100. In some embodiments, terminal enclosure platform 106 comprises multiple parts that are coupled to other parts of antenna 100, including radome 101, to enclose core antenna 102.

Figure 2:
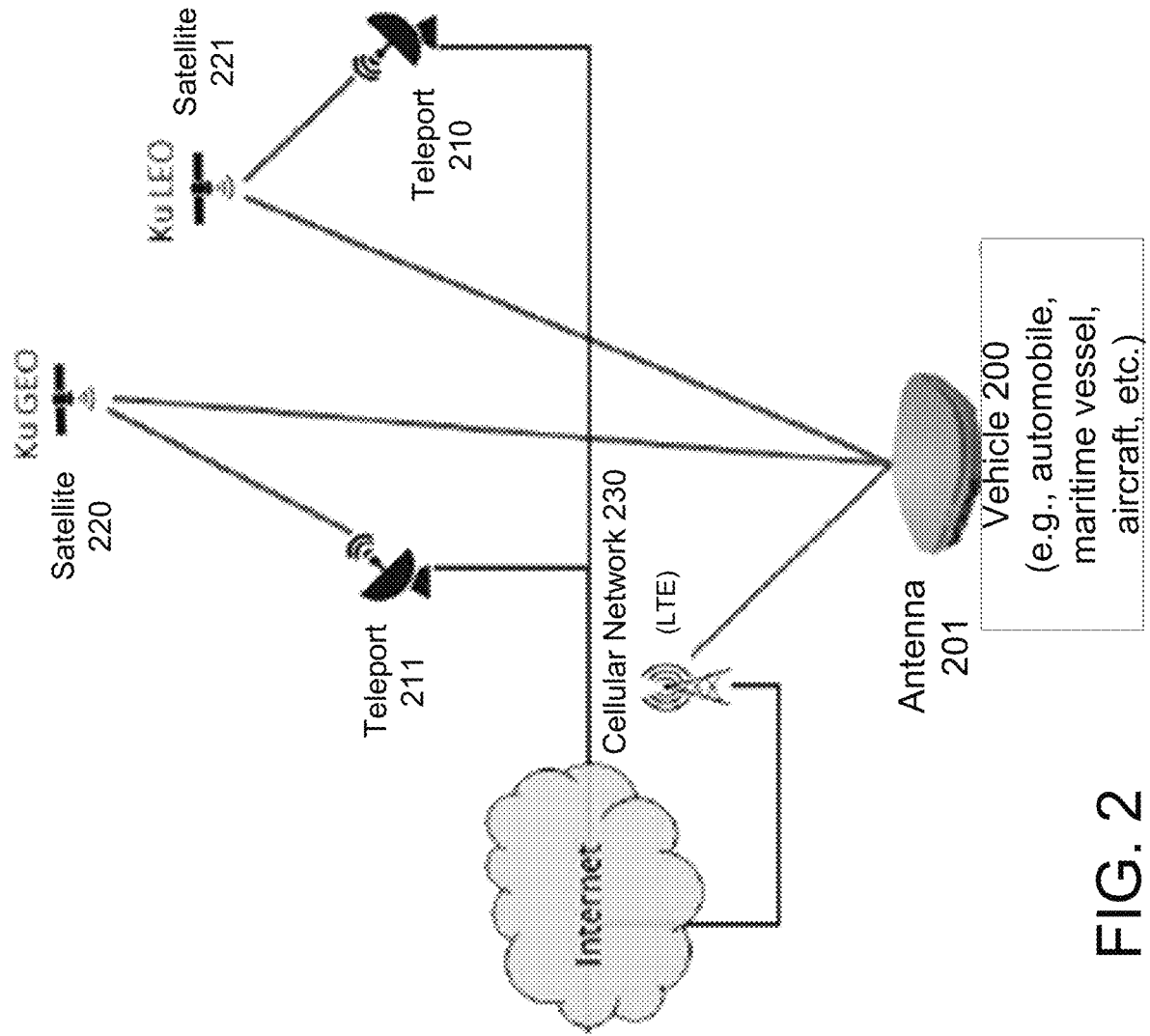
FIG. 2 illustrates an example of a communication system that includes one or more antennas described herein.

FIG. 2 illustrates an example of a communication system that includes one or more antennas described herein. Referring to FIG. 2, vehicle 200 includes an antenna 201. In some embodiments, antenna 201 comprises antenna 100 of FIG. 1.

In some embodiments, vehicle 200 may comprise any one of several vehicles, such as, for example, but not limited to, an automobile (e.g., car, truck, bus, etc.), a maritime vehicle (e.g., boat, ship, etc.), airplanes (e.g., passenger jets, military jets, small craft planes, etc.), etc. Antenna 201 may be used to communicate while vehicle 200 is either on-the-pause, or moving. Antenna 201 may be used to communicate to fixed locations as well, e.g., remote industrial sites (mining, oil, and gas) and/or remote renewable energy sites (solar farms, windfarms, etc.).

In some embodiments, antenna 201 is able to communicate with one or more communication infrastructures (e.g., satellite, cellular, networks (e.g., the Internet), etc.). For example, in some embodiments, antenna 201 is able to communication with satellites 220 (e.g., a GEO satellite) and 221 (e.g., a LEO satellite), cellular network 230 (e.g., an LTE, etc.), as well as network infrastructures (e.g., edge routers, Internet, etc.). For example, in some embodiments, antenna 201 comprises one or more satellite modems (e.g., a GEO modem, a LEO modem, etc.) to enable communication with various satellites such as satellite 220 (e.g., a GEO satellite) and satellite 221 (e.g., a LEO satellite) and one or more cellular modems to communicate with cellular network 230. For another example of an antenna communicating with one or more communication infrastructures, see U.S. patent Ser. No. 16/750,439, entitled "Multiple Aspects of Communication in a Diverse Communication Network", and filed Jan. 23, 2020.

In some embodiments, to facilitate communication with various satellites, antenna 201 performs dynamic beam steering. In such a case, antenna 201 is able to dynamically change the direction of a beam that it generates to facilitate communication with different satellites. In some embodiments, antenna 201 includes multi-beam beam steering that allows antenna 201 to generate two or more beams at the same time, thereby enabling antenna 201 to communicate with more than one satellite at the same time. Such functionality is often used when switching between satellites (e.g., performing a handover). For example, in some embodiments, antenna 201 generates and uses a first beam for communicating with satellite 220 and generates a second beam simultaneously to establish communication with satellite 221. In some embodiments, after establishing communication with satellite 221, antenna 201 stops generating the first beam to end communication with satellite 220 while switching over to communicate with satellite 221 using the second beam. For more information on multi-beam communication, see U.S. Pat. No. 11,063,661, entitled "Beam Splitting Hand Off Systems Architecture", issued Jul. 13, 2021.

In some embodiments, antenna 201 uses path diversity to enable a communication session that is occurring with one communication path (e.g., satellite, cellular, etc.) to continue during and after a handover with another communication path (e.g., a different satellite, a different cellular system, etc.). For example, if antenna 201 is in communication with satellite 220 and switches to satellite 221 by dynamically changing its beam direction, its session with satellite 220 is combined with the session occurring with satellite 221.

Thus, the antennas described herein may be part of a satellite terminal that enables ubiquitous communications and multiple different communication connections.

Shaping Transmission and Predistortion

Embodiments of satellite communication systems are disclosed herein that shape transmissions between a satellite and a ground station, such as a satellite network terminal, to counteract or compensate for the distortion associated with the transfer function of the antenna of the ground station. In some embodiments, these antennas are flat panel antennas. In some embodiments, the flat panel antennas perform analog beamforming. In some embodiments, the techniques disclosed herein exploit a relationship between the satellite pointing and the satellite terminal to estimate the scan angle of the terminal and then estimate the transfer function of the antenna at that scan angle. Based on the estimated scan angle, the satellite identifies how to mitigate the distortion associated with the transfer function of the antenna of the ground station.

In some embodiments, mitigation of the distortion associated with the transfer function of the antenna is accomplished by performing or otherwise applying predistortion on the signals to be transmitted to the ground station. In some embodiments, the predistortion is applied by the satellite, examples of which are described below. In some embodiments, the application of predistortion enables the satellite to shape its look angle to relate its contour to the ground station antenna look angle, and therefore to relate it to a transfer function of the antenna.

By performing pre-distortion, the signal quality is improved for flat panel antennas on emerging satellite architectures such as, for example, but not limited to, satellite beam hopping, beams that follow a user terminal or geographic region, tight spot beams, and rolling beams such as for example, a "venetian blinds" contour design. These predistortion techniques can be implemented on satellites, including those satellites that have regenerative payloads and with more software defined hub infrastructure. Furthermore, applying predistortion in this manner mitigates the effects of a distant aperture, which is in contrast to where predistortion is typically applied to linearize the amplifiers only.

Moreover, analog flat panel antennas are subject to beam squint, which reduces the instantaneous bandwidth (IBW) and therefore limits the performance of large apertures. More specifically, some antenna apertures have IBW limitations. Ultimately, the BER (bit error rate) of a data carrier increases at higher bandwidths as the flat panel antenna's scan angle increases. This is due to the transfer function of the antenna which distorts the data carrier by inducing amplitude and delay imbalances across the channel. Using the techniques according to embodiments of the present disclosure would enable antennas to exhibit higher throughputs expected with larger channel bandwidths (e.g., large carriers, many subcarriers (OFDM-like)).

Figure 3:
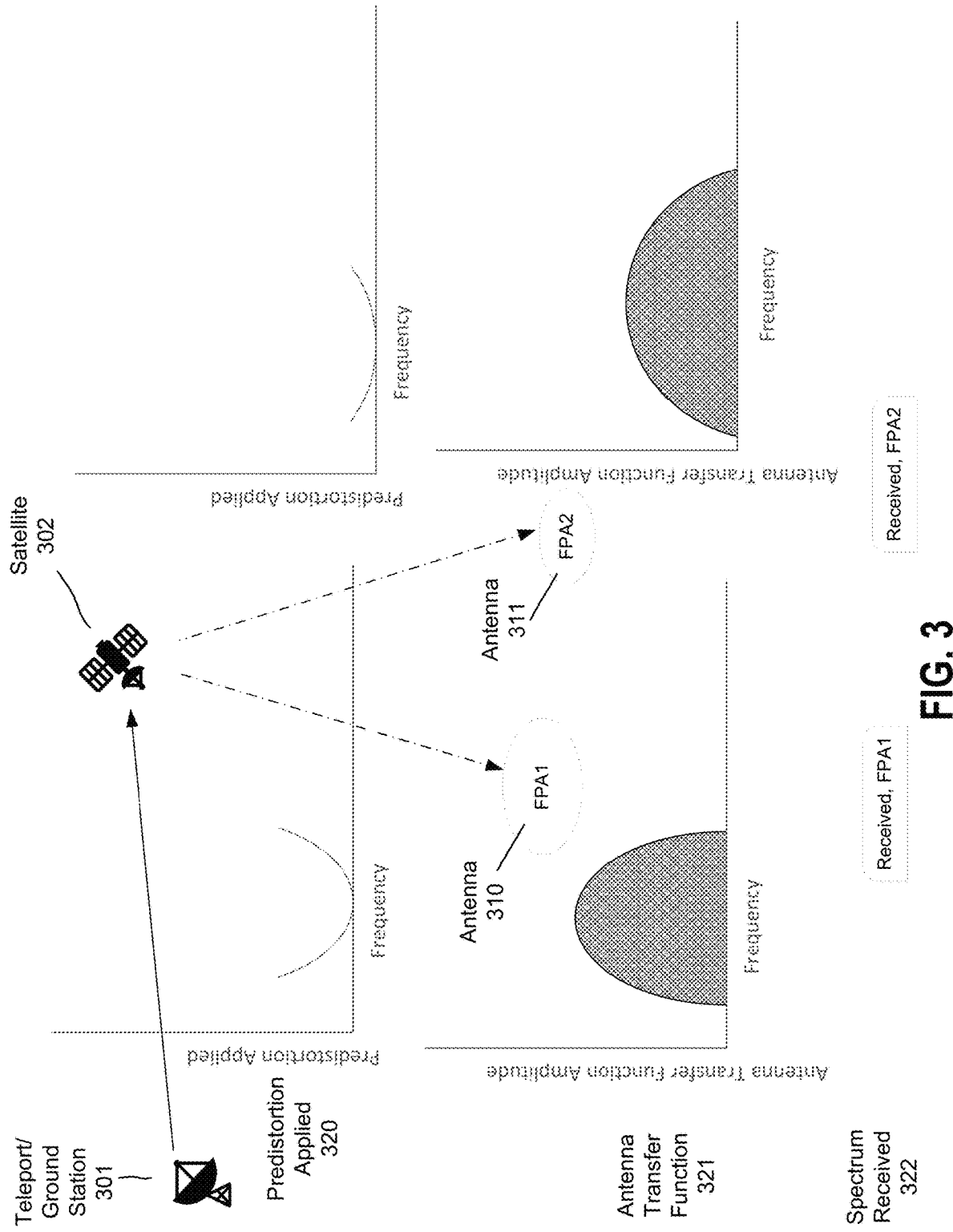
FIG. 3 illustrates some embodiments of a satellite communication system.
Figure 4:
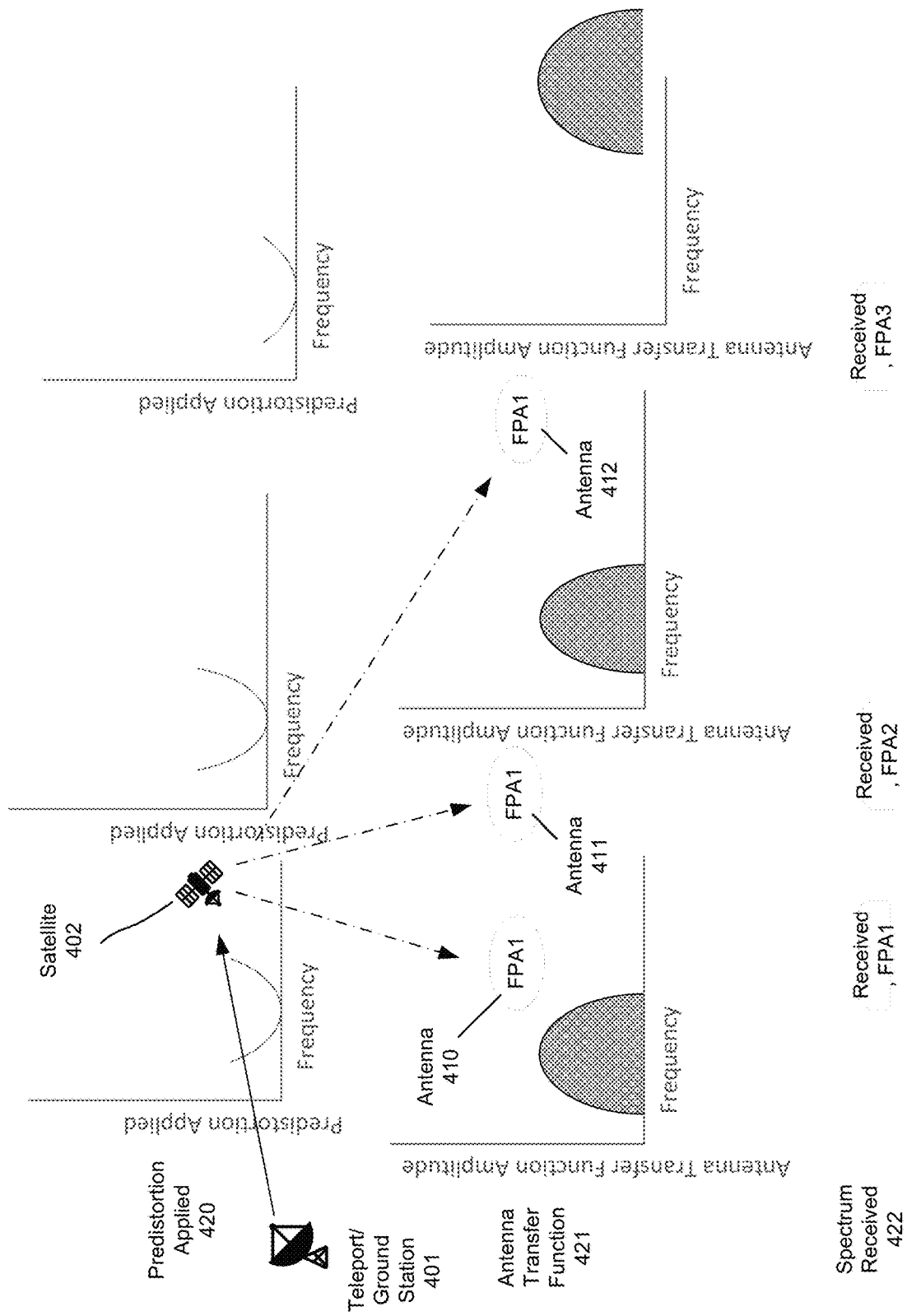
FIG. 4 illustrates some other embodiments of a satellite communication system in which all the antenna apertures of the flat panel satellite antennas are all the same size but their look angles are all different.

FIGS. 3 and 4 below illustrate predistortion variation for flat panel antennas. The predistortion that is applied can be based on the scan angle or look angle associated with the antenna. The scan angle refers to the antenna coordinate frame, while the look angle typically refers to the frame at that point on the Earth with the difference between the two being that tilting the antenna in place changes the scan angle while the look angle is constant. In some embodiments, selecting the predistortion to apply based on specific scan angle information (e.g., from antenna feedback) can result in the selection of a more accurate predistortion than if predistortion is selected based on the look angle. However, if the scan angle is not available, predistortion that is selected based on a look angle would still provide benefit and can be a simpler implementation, particularly for beams servicing a family of antennas.

In some embodiments, predistortion is applied at the satellite on signals being transmitted towards the remote user terminal. This implementation is a flexible implementation for satellites that contain inter-satellite links. In some embodiments, the satellite communication system uses a fixed spot beam architecture with dedicated "mobility" carriers intended to service flat panel antennas on platforms where the use or inclusion of parabolic antennas are impractical.

FIG. 3 illustrates predistortion variation for flat panel antennas with different sizes but having the same scan angles. Referring to FIG. 3, teleport/ground station 301 communicates with flat panel antennas 310 and 311 through satellite 302. In some embodiments, antennas 310 and 311 are user terminals participating in the same network. In some embodiments, antennas 310 and 311 have apertures that are different in size. In some other embodiments, the apertures of antennas 310 and 311 are the same size. Although only one teleport, two flat panel antennas and one satellite are shown in FIG. 3, the communication system can include more teleports, flat panel antenna and satellites.

Each of antennas 310 and 311 has an antenna transfer function 321. Based on their antenna transfer function 321, antennas 310 and 311 have a receive spectrum illustrated as received spectrum 322. In order to counteract the distortion in the received signal that occurs due to the effect of antenna transfer function 321, satellite 302 applies predistortion to the signal that is transmitted from satellite 302 to antennas 310 and 311. In other words, the predistortion compensates for the distortion caused by the antenna transfer function of antennas 310 and 311. In some embodiments, the predistortion applied to the signals transmitted to antennas 310 and 311 is an inverse to their individual antenna transfer functions. In some embodiments, the predistortion is in the form a predistortion curve. The predistortion curve can be an inverse (or approximate inverse) of the antenna transfer function. Note that for nonlinear systems, it's common to approximate by over-constraining the models or narrowing the valid range such that models are linearizable. In some embodiments, the antenna transfer functions are computed/modeled and/or measured, and the result of the computing/modeling or measuring is used to determine the desired predistortion to apply. In some other embodiments, the predistortion applied is not an exact inverse to the antenna transfer function. In some of these other embodiments, the predistortion that is applied is based on one or more of lower order approximations to simplify computational load (or as limited by number of available equalizer taps), a reduced update frequency (e.g., compute once when it comes onto network or into that beam coverage, only update on predetermined intervals (e.g., one time per day, as needed, etc.)), a reduced scan angle resolution, geometric approximations vs measured data, simplified geometries to assume radial symmetry (e.g., reduce phi/az dependency), averaging across phi, a more time-averaged approach for mobility, an inverse based on geographic location/look angle instead of scan angle, and an inverse based on a more averaged or MMSE across all terminals in service region.

In some embodiments, the predistortion applied varies for flat panel having different sized apertures even though they have the same look angles. That is, while the look angles for antennas 310 and 311 are the same, the predistortion 320 applied to the signals being transmitted to those antennas may be different based on the different antenna transfer functions (antenna transfer function 321) due to their different sizes.

Note that FIG. 3 illustrates depict an amplitude only predistortion for simplicity of the explanation; however, in some embodiments, the predistortion is also be applied to phase or group delay. Also, while scan angles are used to direct the applied predistortion in FIG. 3, in alternative embodiments the look angle can be used instead.

In some embodiments, the configuration of the satellite communication system includes only antennas that have the same aperture size. In such systems, applying predistortion is simpler since the relationship between the satellite terminals serviced by that beam has a fixed scan angle relative to the satellite. The modulated carrier servicing the mobility beam is shaped by a filter designed to mitigate the amplitude and group delay characteristics of ground antenna at that scan angle. This configuration is valid for many legacy GEO spot beams and for LEOs with spot beams whose pointing remain fixed relative to the satellite.

FIG. 4 illustrates some embodiments of a satellite communication system in which all the antenna apertures of the flat panel satellite antennas are all the same size but their scan angles are all different. Because all the scan angles are different, their associated antenna transfer functions are different. Thus, the amount of predistortion applied varies with the varying antenna transfer functions that vary due to differences in scan angles. In such a case, in order to enable all the antennas to obtain the same sized receive spectrum, the predistortion applied to each of the signals being transmitted to and received by these antennas is different. For example, in some embodiments, a network operator can choose to apply predistortion based on maximizing the signal quality across a family of antennas, which may result in lower fidelity approximations as described above. Even so, that broader compensation would be particularly useful in broadcast/multi-cast scenarios.

Referring to FIG. 4, teleport/ground station 401 communicates with flat panel antennas 410-412 through satellite 402. In some embodiments, antennas 410-412 are part of user terminals in the same network. In some embodiments, antennas 410-412 have apertures that are the same size. Although only one teleport, three flat panel antennas and one satellite are shown in FIG. 4, the communication system can include more teleports, flat panel antenna and satellites.

Each of antennas 410-412 has an antenna transfer function 421. Based on their antenna transfer function 421, antennas 410-412 have a receive spectrum illustrated as received spectrum 422. In order to counteract the distortion in the received signal that occurs due to the effect of antenna transfer function 421, satellite 402 applies predistortion to the signal that is transmitted from satellite 402 to antennas 410-412. In other words, the predistortion compensates for the distortion caused by the antenna transfer function of antennas 410-412. In some embodiments, the predistortion applied to the signals transmitted to antennas 410-412 is a compliment to their individual antenna transfer functions. In some embodiments, the predistortion is in the form a predistortion curve. The predistortion curve can be an inverse of the antenna transfer function. In some other embodiments, the predistortion applied is not an exact inverse to the antenna transfer function.

In some embodiments, the predistortion applied varies for flat panel antennas have different look angles even though their apertures are the same in size. That is, while the antenna apertures for antennas 410-412 may be the same, the predistortion 420 applied to the signals being transmitted to those antennas is different based on the different antenna transfer functions 421 associated with their different look angles.

Note that FIG. 4 illustrates depict an amplitude only predistortion for simplicity of the explanation; however, in some embodiments, the predistortion is also be applied to phase or group delay. Also, while scan angles are used to direct the applied predistortion in FIG. 4, in alternative embodiments the look angle can be used instead.

Figure 5A:
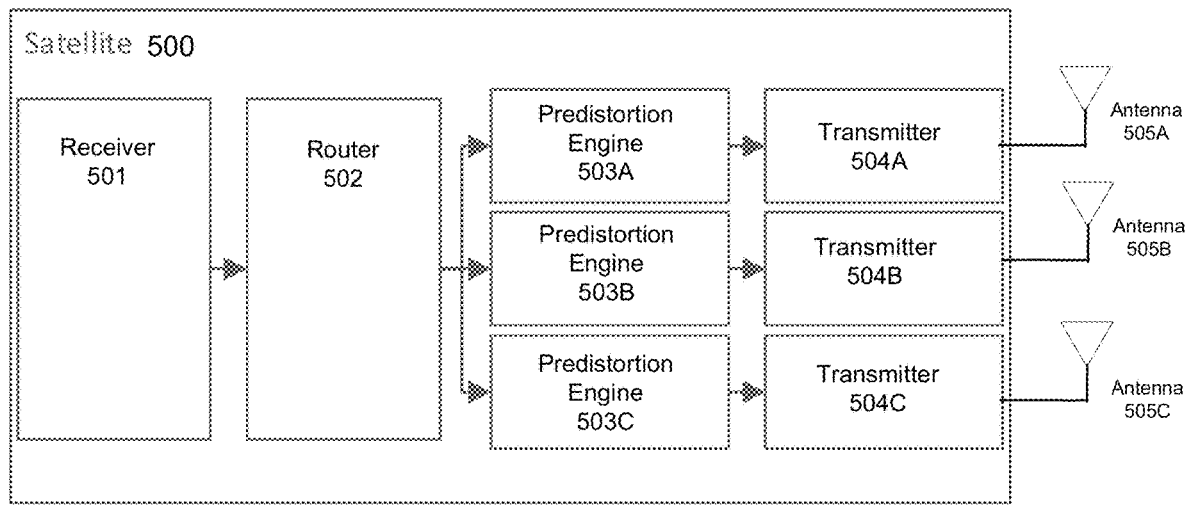
FIG. 5A is a block diagram of some embodiments of a satellite that applies predistortion.

FIG. 5A is a block diagram of some embodiments of a satellite that applies predistortion in order to compensate for the distortion associated with antenna transfer functions of flat panel antennas that are receiving the satellite's signal. Referring to FIG. 5A, satellite 500 includes receiver 501 that receives signals with data that can be transmitted to one or more flat panel antennas. In some embodiment, the received signals are from a hub, teleport or other ground station. A router 502 is coupled to receiver 501 and routes signals for transmission on separate antennas 505A-505C of satellite 500.

Satellite 500 also includes predistortion engines 503A-503C that apply predistortion to the signals to be transmitted to the flat panel antennas. In some embodiments, the predistortion is applied to compensate for the various transfer functions associated with each of the flat panel antennas. After applying the predistortion, the predistorted signals are transmitted using one of transmit blocks (e.g., transmitters 504A-504C) and its associated antennas (e.g., antennas 505A-505C). As satellite 500 has multiple transmit blocks, satellite 500 is capable of generating multiple beams. Note that while satellite 500 shows only three predistortion engines and three transmitters, satellite 500 can have any number of predistortion engines and transmitters with their associated antennas.

Figure 5B:
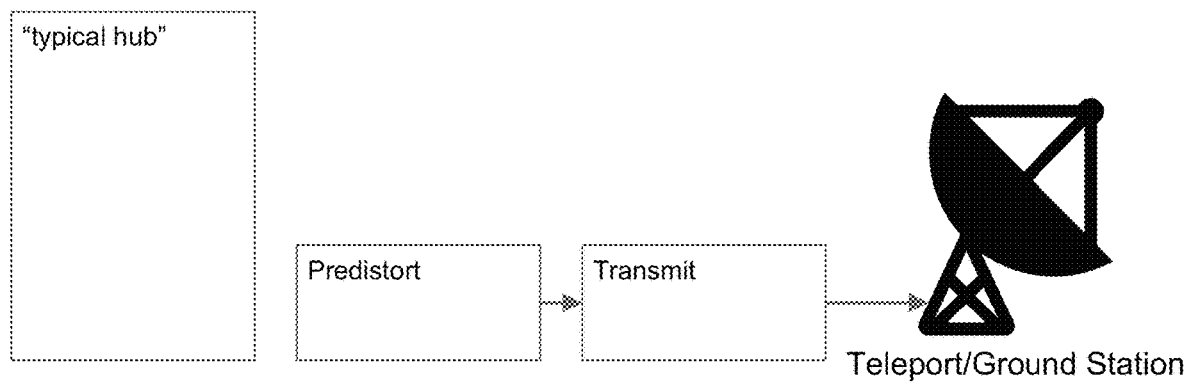
FIG. 5B is a block diagram of some embodiments of a ground station/teleport that applies predistortion.

In some embodiments, the predistortion is applied by a ground station or teleport to signals and then the signals are sent to the satellite for transmission to a flat panel antenna. In such a case, the predistortion engine is part of the ground station/teleport and the satellite includes a pass through, instead of a predistortion engine, which does not apply predistortion. FIG. 5B illustrates an example of such an arrangement.

Figure 6:
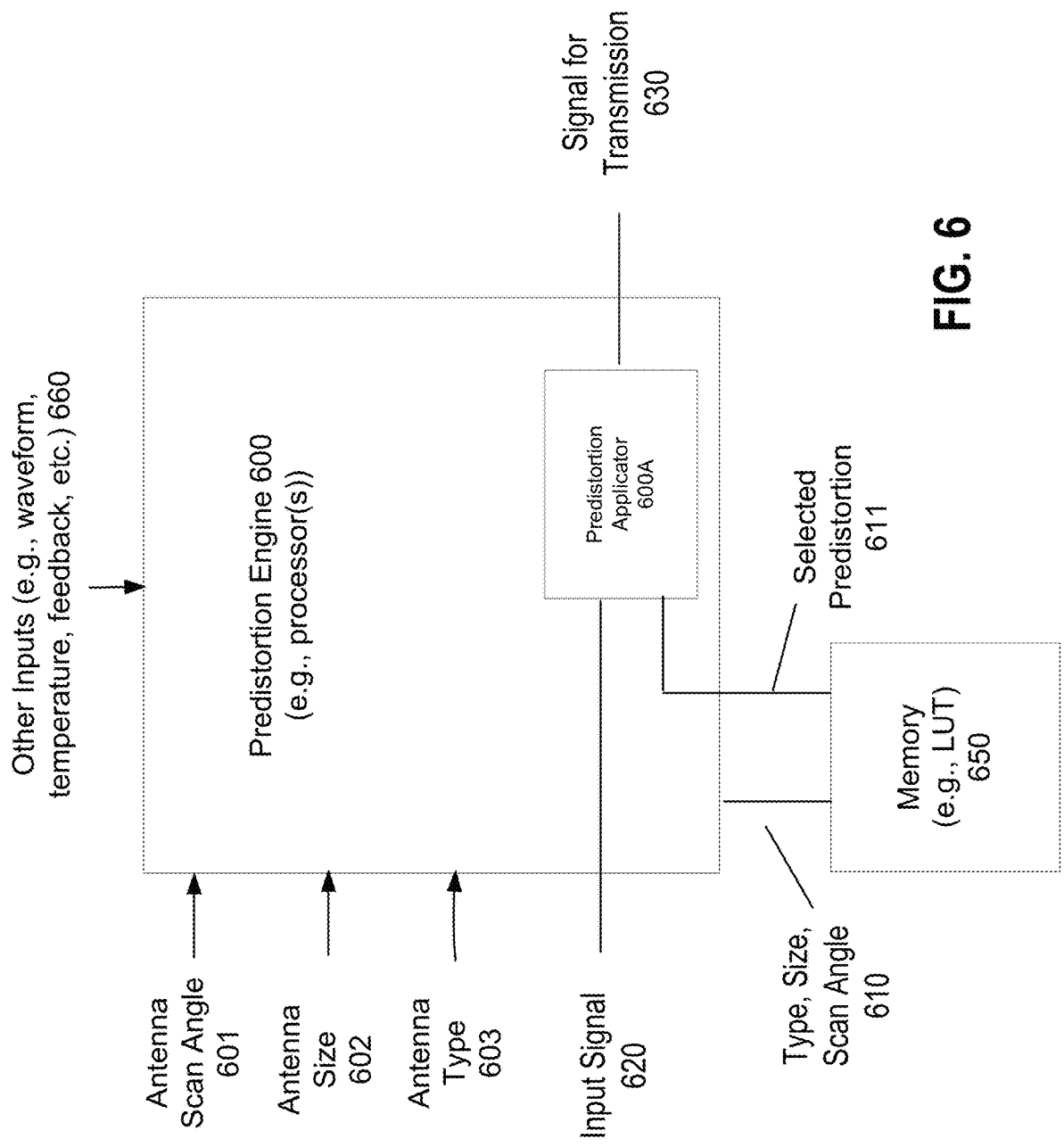
FIG. 6 illustrates some embodiments of a predistortion engine.

FIG. 6 illustrates some embodiments of a predistortion engine. In some embodiments, the predistortion engine of FIG. 6 is part of satellite 500 of FIG. 5. Referring to FIG. 6, predistortion engine 600 performs predistortion on an input signal to be transmitted to a flat panel antenna. In some embodiments, predistortion engine 600 receives input signals and, based on these input signals, determines the amount of predistortion that is to be applied to an input signal 620 and outputs the predistorted signal for transmission via a transmitter and antenna of a satellite. In some embodiments, predistortion engine 600 receives antenna scan angle 601, antenna aperture size 602, and antenna type 603 of a flat panel antenna and, based on these input signals, determines an amount of predistortion to apply to the signals being transmitted to the flat panel antenna. In some embodiments, antenna scan angle 601 can be calculated by a scan angle generator, such as, for example, the one described in conjunction with FIG. 7A. In some other embodiments, antenna scan angle 601 is provided by a ground station (e.g., a satellite terminal, a teleport, etc.). In some other embodiments, predistortion engine 600 receives a look angle instead of scan angle 601 and determines the predistortion to apply, at least in part, based on a look angle associated with an antenna.

Antenna type 603 specifies different technology types that influence the type of transfer function that an antenna can have. For example, antenna type 603 can indicate whether the antenna performs digital, analog or hybrid beamforming. Antenna type 603 can include information specifying different feed designs, tuning technology, array layouts, taperings, and shapes that can all lead to different transfer functions for the antenna. In some embodiments, antenna type 603 includes information specifying a make/model and any appropriate configurations of the antennas. All of these features can impact the transfer function of an antenna and is used by predistortion engine 600 to determine, and then apply, the predistortion to signals being transmitted to the antenna to compensate for the distortion associated with the antenna transfer function of a flat panel antenna. Antenna size 602 and antenna type 603 can be obtained during registration or provisioning and thereafter be provided to the satellite.

In some embodiments, predistortion engine 600 determines the amount of predistortion to apply to a signal being transmitted to a flat panel antenna using predefined amounts of distortion. The amount of predistortion can be in the form of a curve or other function that is applied to a signal. For example, in some embodiments, a series of tunable/adaptive filter(s) can be used to apply the predistortion to the signal. In some embodiments, such filters include digital filters with taps updated pursuant to information stored in a memory (e.g., memory 650, a lookup table (LUT), etc.) and/or based on feedback from the user terminal. In some embodiments, these predefined amounts of predistortion are stored to memory, such as memory 650, and predistortion engine 600 accesses memory 650 to obtain an indication of the predistortion that is to be applied to a particular antenna with the type, size and scan angle specified in the inputs. That is, in some embodiments, predistortion engine 600 uses inputs 610, such as, for example, antenna type 603, antenna size 602 and antenna scan angle 601 to access memory 650. In some embodiments, memory 650 is a lookup table (LUT) that looks up the predistortion that is to be applied based on inputs 610. In response these inputs, memory 650 provides selected predistortion 611.

Selected predistortion 611 indicates to predistortion applicator 600A the distortion that should be applied to input signal 620. In response, predistortion applicator 600A uses selected predistortion 611 to apply predistortion to signal 620 to produce a signal for transmission 630. Note this process can be performed for each antenna to which the satellite is transmitting.

In some embodiments, predistortion engine 600 determines the amount of predistortion to apply based on one or more other inputs 660. In some embodiments, predistortion engine 600 determines the amount of predistortion to apply based on the waveform of the signal being that is to be transmitted to the flat panel antenna. In some other embodiments, predistortion engine 600 determines the amount of predistortion to apply based on the temperature of the antenna. In yet some other embodiments, predistortion engine 600 determines the amount of predistortion to apply based on feedback that is received. In some embodiments, the feedback comprises results from the user terminal of on-terminal equalization that is sent back to the satellite and/or teleport so that it may pre-compensate the appropriate packets. The use of predistortion in this case may be characterized as efforts to reduce, and potentially minimize, the local equalization and/or the variance across the band at the receiver of the user terminal. In some embodiments, the local equalization and/or the variance across the band at the receiver is either defined with some sort of training bit sequence either when first coming onto network (or embedded in the packet structures) that the systems can use to calibrate or simply by using other techniques (e.g., hill-climbing on signal quality metrics such as, for example, but not limited to, signal-to-noise ratio (SNR), energy per bit to noise power spectral density ratio (EsNo), bit error rate (BER), error vector magnitude (EVM), etc. In some embodiments, providing such feedback may need some carve out in the packet structures (at least on the uplink) to convey the information (e.g., equalizer tap settings, etc.) back to the satellite.

In some embodiments, the network terminals with the flat panel antennas in the satellite communication system performing satellite beam hopping. As complexity is added to the satellite communication system for a dynamic spot beam, similar to that which is added when the system uses satellite beam hopping, a carrier servicing multiple terminal types like flat panel antennas and parabolic antennas or a carrier servicing flat panels of various sizes the complexity of the system increases. A dynamic spot beam requires a dynamic input of the beam steering information to the predistortion and a parameterized model or look up table (LUT) within the predistortion engine discussed above that's valid across the scan range serviced by that beam. As the beam moves, the predistortion engine recalculates the predistortion based on the updated scan angle projections. As network terminals with different antenna types and sizes become mixed, the router (e.g., router 502 of FIG. 5) associates the modulated carrier with the required predistortion model as well.

Figure 7A:
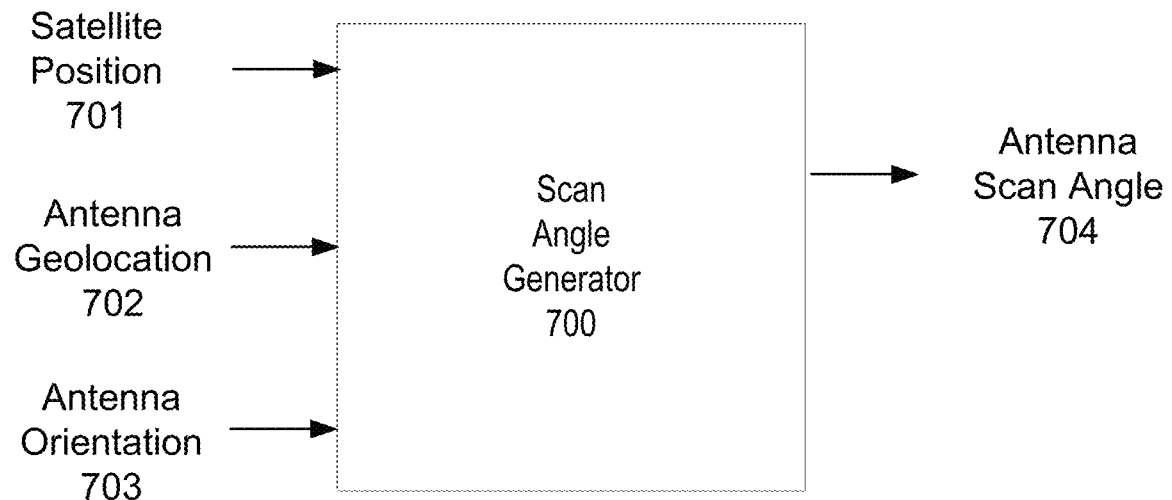
FIG. 7A illustrates one example of a scan angle generator.

FIG. 7A illustrates one example of a scan angle generator. Referring to FIG. 7A, scan angle generator 700 receives satellite position 701, geolocation 702 of a flat panel antenna, and antenna orientation 703. In response to the inputs, scan angle generator 700 calculates scan angle 704 of the flat panel antenna that is going to communicate with the satellite.

Figure 7B:
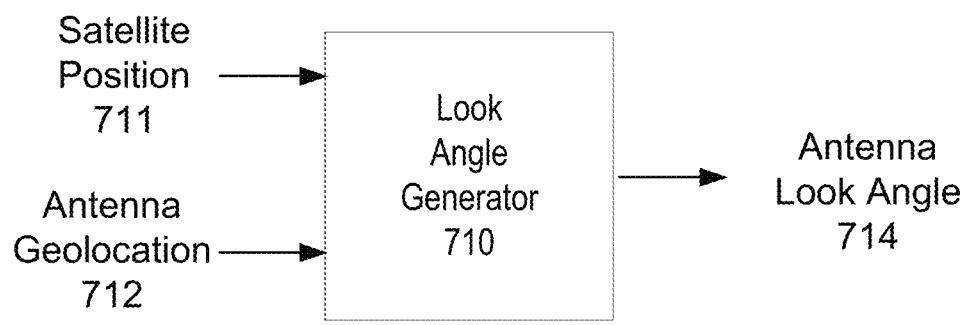
FIG. 7B illustrates one example of a look angle generator.

FIG. 7B illustrates one example of a look angle generator. Referring to FIG. 7B, look angle generator 710 receives satellite position 711 and geolocation 712 of a flat panel antenna. In response to the inputs, look angle generator 710 calculates look angle 714 of the flat panel antenna that is going to communicate with the satellite.

Figure 8:
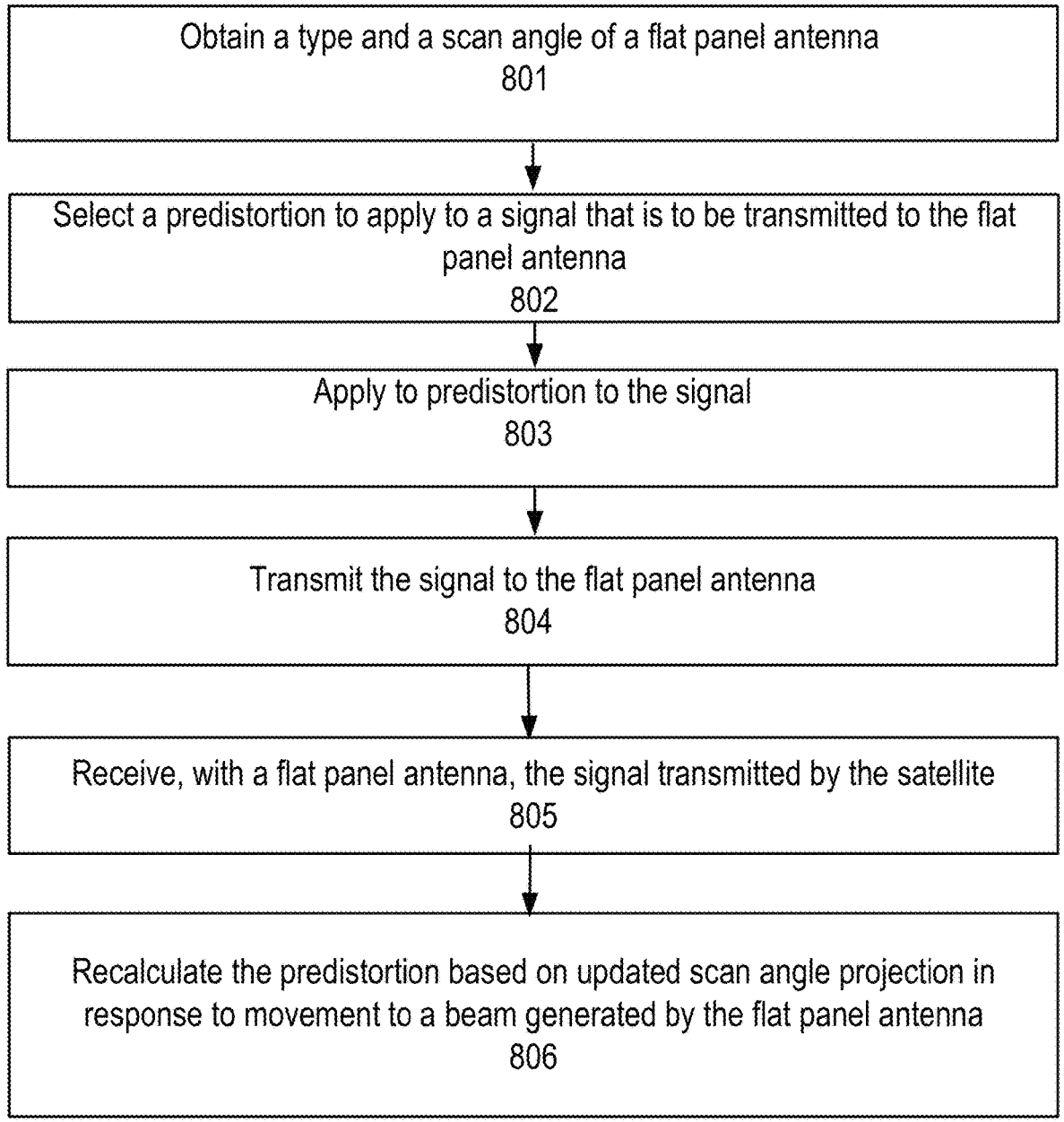
FIG. 8 is a flow diagram of some embodiments of a process for applying predistortion to a signal for transmission to a flat panel antenna.

FIG. 8 is a flow diagram of some embodiments of a process for applying predistortion to a signal for transmission to a flat panel antenna. The method can be performed by processing logic that may include hardware (circuitry, dedicated logic, etc.), software (such as is run on a general-purpose computer system or a dedicated machine), firmware, or a combination thereof. In some embodiments, the process is performed by a satellite.

Referring to FIG. 8, the process begins by processing logic obtaining a type and a scan angle of a flat panel antenna (processing block 801). In some embodiments, processing logic obtains the scan angle by calculating the scan angle based on position of a satellite and geolocation of the satellite terminal. In some other embodiments, processing logic obtains the scan angle from a ground station (e.g., teleport, etc.). In some alternative embodiments, processing logic obtains the scan angle from the flat panel antenna itself.

Based on the antenna type and scan angle, processing logic selects a predistortion to apply to a signal that is to be transmitted to the flat panel antenna (processing block 802). In some embodiments, the predistortion is related to the antenna transfer function of the flat panel antenna at the scan angle. In some embodiments, predistortion is to compensate for distortion associated with antenna transfer function of the flat panel antenna at the scan angle. In some embodiments, the predistortion is a compliment of the antenna transfer function of the flat panel antenna at the scan angle. In some embodiments, selecting the predistortion is based on this aperture size of the flat panel antenna. In some embodiments, selecting the predistortion is also based on one or more of the waveform being used for the signal being transmitted, temperature of the antenna, and/or feedback information.

After determining the predistortion that is to be applied to a signal to be transmitted to the flat panel antenna, processing logic applies to predistortion to the signal (processing block 803) and transmits the signal to the flat panel antenna (processing block 804). In some embodiments, applying the predistortion in transmitting the signal to the flat panel antenna is performed by a satellite. In other embodiments, the predistortion is applied by a ground station (e.g., teleport, etc.) and the transmission of the predistorted signal is performed by a satellite.

In some embodiments, the process comprises processing logic receiving, with a flat panel antenna, the signal transmitted by the satellite (processing block 805). In some embodiments, the flat panel antenna performs analog beam forming to receive the signal.

In some embodiments, the process further comprises processing logic recalculating the predistortion based on updated scan angle projection in response to movement to a beam generated by the flat panel antenna (processing block 806). The scan angle of the flat panel antenna changes as the flat panel antenna is moved. Such movement may be due to the movement of a vehicle (or car), maritime vessel or other object that is attached to the flat panel antenna.

There are a number of additional alternatives to the predistortion processing described above. For example, the techniques disclosed herein may be viable with terrestrial communications as well (e.g., mmWave 5G). In such a case, in some embodiments, the predistortion processing could be performed on the handsets. In some other embodiments, predistortion may be implemented either from where the carrier originates (at the hub/teleport in the case of the forward (FWD) link).

There are a number of example embodiments described herein.

Example 1 is a method comprising: obtaining a type and scan angle of a flat panel antenna of a satellite terminal; selecting, based on the type and the scan angle, predistortion to apply to a signal to be transmitted to the flat panel antenna; applying the predistortion to the signal; and transmitting the signal to the flat panel antenna of the satellite terminal.

Example 2 is the method of example 1 that may optionally include estimating an antenna transfer function of the flat panel antenna at the scan angle.

Example 3 is the method of example 1 that may optionally include that the predistortion is related to an antenna transfer function of the flat panel antenna at the scan angle.

Example 4 is the method of example 3 that may optionally include that the predistortion is an inverse of the antenna transfer function of the flat panel antenna at the scan angle.

Example 5 is the method of example 1 that may optionally include that selecting the predistortion is based on aperture size of the flat panel antenna.

Example 6 is the method of example 5 that may optionally include that selecting the predistortion is based on one or more selected from a group consisting of: waveform, temperature of the antenna, and feedback information.

Example 7 is the method of example 1 that may optionally include that the predistortion is to compensate for distortion associated with an antenna transfer function of the flat panel antenna at the scan angle.

Example 8 is the method of example 1 that may optionally include that applying the predistortion and transmitting the signal to the flat panel antenna are performed by a satellite.

Example 9 is the method of example 8 that may optionally include receiving, with the flat panel antenna performing analog beamforming, the signal transmitted by the satellite.

Example 10 is the method of example 1 that may optionally include calculating the scan angle based on satellite position and geolocation of the satellite terminal.

Example 11 is the method of example 1 that may optionally include recalculating the predistortion based on an updated scan angle projection in response to movement of a beam generated by the flat panel antenna.

Example 12 is a satellite comprising: a receiver to receive data to be transmitted to a flat panel antenna of a satellite terminal; a predistortion engine implemented at least partially in hardware and having one or more processors to obtain a type and scan angle of the flat panel antenna of a satellite terminal; select, based on the type indication and the scan angle, predistortion to apply to a signal with the data to be transmitted to the flat panel antenna; apply the predistortion to the signal; and a transmitter to transmit the signal to the flat panel antenna of the satellite terminal.

Example 13 is the satellite of example 12 that may optionally include that the predistortion engine is operable to estimate an antenna transfer function of the flat panel antenna at the scan angle.

Example 14 is the satellite of example 12 that may optionally include that the predistortion is related to an antenna transfer function of the flat panel antenna at the scan angle to compensate for distortion associated with a transfer function of the flat panel antenna at the scan angle.

Example 15 is the satellite of example 14 that may optionally include that the predistortion is an inverse of the antenna transfer function of the flat panel antenna at the scan angle.

Example 16 is the satellite of example 12 that may optionally include that selecting the predistortion is based on aperture size of the flat panel antenna.

Example 17 is the satellite of example 16 that may optionally include that selecting the predistortion is based on one or more selected from a group consisting of: waveform, temperature, and feedback information.

Example 18 is a non-transitory computer readable storage media having instructions stored thereupon which, when executed by a system having at least a processor and a memory therein, cause the system to perform a method comprising: determining an indication of a type and scan angle of a flat panel antenna of a satellite terminal; selecting, based on the type indication and the scan angle, predistortion to apply to a signal to be transmitted to the flat panel antenna; applying the predistortion to the signal; and transmitting the signal to the flat panel antenna of the satellite terminal.

Example 19 is the non-transitory computer readable storage media of example 18 that may optionally include that the predistortion is related to an antenna transfer function of the flat panel antenna at the scan angle.

Example 20 is the non-transitory computer readable storage media of example 18 that may optionally include that selecting the predistortion is based on aperture size of the flat panel antenna.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

The invention claimed is:

1. A method comprising:
receiving a type and scan angle of a flat panel antenna of a satellite terminal as feedback;
selecting, based on the type and the scan angle, predistortion to apply to a signal to be transmitted to the flat panel antenna;
applying the predistortion to the signal to compensate for distortion due to one or more characteristics of the flat panel antenna; and
transmitting the signal to the flat panel antenna of the satellite terminal.

2. The method of claim 1 further comprising estimating an antenna transfer function of the flat panel antenna at the scan angle.

3. The method of claim 1 wherein the predistortion is related to an antenna transfer function of the flat panel antenna at the scan angle.

4. The method of claim 3 wherein the predistortion is an inverse of the antenna transfer function of the flat panel antenna at the scan angle.

5. The method of claim 1 wherein selecting the predistortion is based on aperture size of the flat panel antenna.

6. The method of claim 5 wherein selecting the predistortion is based on one or more selected from a group consisting of: waveform, temperature of the antenna, and feedback information.

7. The method of claim 1 wherein the predistortion is to compensate for distortion associated with an antenna transfer function of the flat panel antenna at the scan angle.

8. The method of claim 1 wherein applying the predistortion and transmitting the signal to the flat panel antenna are performed by a satellite.

9. The method of claim 8 further comprising, receiving, with the flat panel antenna performing analog beamforming, the signal transmitted by the satellite.

10. The method of claim 1 further comprising calculating the scan angle based on satellite position and geolocation of the satellite terminal.

11. A method comprising:
obtaining a type and scan angle of a flat panel antenna of a satellite terminal;
selecting, based on the type and the scan angle, predistortion to apply to a signal to be transmitted to the flat panel antenna;
applying the predistortion to the signal;
transmitting the signal to the flat panel antenna of the satellite terminal; and
recalculating the predistortion based on an updated scan angle projection in response to movement of a beam generated by the flat panel antenna.

12. A satellite comprising:
a receiver to receive data to be transmitted to a flat panel antenna of a satellite terminal;
a predistortion engine implemented at least partially in hardware and having one or more processors to
receive a type and scan angle of the flat panel antenna of a satellite terminal as feedback;
select, based on the type indication and the scan angle, predistortion to apply to a signal with the data to be transmitted to the flat panel antenna;
apply the predistortion to the signal to compensate for distortion due to one or more characteristics of the flat panel antenna; and
a transmitter to transmit the signal to the flat panel antenna of the satellite terminal.

13. The satellite of claim 12 wherein the predistortion engine is operable to estimate an antenna transfer function of the flat panel antenna at the scan angle.

14. The satellite of claim 12 wherein the predistortion is related to an antenna transfer function of the flat panel antenna at the scan angle to compensate for distortion associated with a transfer function of the flat panel antenna at the scan angle.

15. The satellite of claim 14 wherein the predistortion is an inverse of the antenna transfer function of the flat panel antenna at the scan angle.

16. The satellite of claim 12 wherein selecting the predistortion is based on aperture size of the flat panel antenna.

17. The satellite of claim 16 wherein selecting the predistortion is based on one or more selected from a group consisting of: waveform, temperature, and feedback information.

18. A non-transitory computer readable storage media having instructions stored thereupon which, when executed by a system having at least a processor and a memory therein, cause the system to perform a method comprising:
receiving an indication of a type and scan angle of a flat panel antenna of a satellite terminal as feedback;
selecting, based on the type indication and the scan angle, predistortion to apply to a signal to be transmitted to the flat panel antenna;
applying the predistortion to the signal to compensate for distortion due to one or more characteristics of the flat panel antenna; and
transmitting the signal to the flat panel antenna of the satellite terminal.

19. The non-transitory computer readable storage media of claim 18 wherein the predistortion is related to an antenna transfer function of the flat panel antenna at the scan angle.

20. The non-transitory computer readable storage media of claim 18 wherein selecting the predistortion is based on aperture size of the flat panel antenna.

* * * * *